(12) United States Patent
De Vos et al.

(10) Patent No.: US 9,373,021 B2
(45) Date of Patent: Jun. 21, 2016

(54) METHOD, APPARATUS AND SYSTEM FOR OUTPUTTING A GROUP OF IMAGES

(75) Inventors: Kurt De Vos, Erpe (BE); Philip Marivoet, Tienen (BE); Vanessa Schelkens, Heverlee (BE); Daniel Clarke, Curracloe (IE)

(73) Assignees: SONY CORPORATION, Tokyo (JP); SONY EUROPE LIMITED, Weybridge (GB)

( * ) Notice: Subject to any disclaimer, the term of this patent is extended or adjusted under 35 U.S.C. 154(b) by 821 days.

(21) Appl. No.: 13/072,041

(22) Filed: Mar. 25, 2011

(65) Prior Publication Data

US 2012/0243750 A1 Sep. 27, 2012

(51) Int. Cl.
*G06K 9/00* (2006.01)
*G06K 9/62* (2006.01)

(52) U.S. Cl.
CPC ........ *G06K 9/00221* (2013.01); *G06K 9/00295* (2013.01); *G06K 9/00677* (2013.01); *G06K 9/6218* (2013.01); *G06K 2009/00322* (2013.01)

(58) Field of Classification Search
None
See application file for complete search history.

(56) References Cited

U.S. PATENT DOCUMENTS

| | | | |
|---|---|---|---|
| 5,781,650 A * | 7/1998 | Lobo | G06K 9/00221 382/118 |
| 6,628,835 B1 * | 9/2003 | Brill et al. | 382/226 |
| 7,319,779 B1 * | 1/2008 | Mummareddy | G06K 9/00288 382/118 |
| 8,306,277 B2 * | 11/2012 | Ichimasa et al. | 382/115 |
| 2004/0247177 A1 * | 12/2004 | Rowe et al. | 382/159 |
| 2009/0185723 A1 * | 7/2009 | Kurtz et al. | 382/118 |
| 2010/0128141 A1 * | 5/2010 | Jang | 348/222.1 |
| 2011/0150302 A1 * | 6/2011 | Moriyama et al. | 382/118 |

* cited by examiner

*Primary Examiner* — Sumati Lefkowitz
*Assistant Examiner* — Ryan P Potts
(74) *Attorney, Agent, or Firm* — Oblon, McClelland, Maier & Neustadt, L.L.P.

(57) ABSTRACT

There is described an apparatus for outputting a group of images for display, the group being taken from a plurality of images, each image in the plurality of images having a face located therein, the apparatus comprising a processor configured to: retrieve a set of images from a storage medium, the set of images containing at least the plurality of images from which the group of images to be displayed is selected; identify the face in each of the plurality of images; identify variable features on the face in each of the plurality of images; establish the group of images in accordance with a measure of the dissimilarity between the variable features in the plurality of images; and output the group of images for display.

21 Claims, 15 Drawing Sheets

| 1010 Name | 1020 Facial Metric | 1030 Photo present |
|---|---|---|
| John Smith | $a/b =$ <br> $d/c =$ <br> $a/c =$ <br> $a/d =$ <br> $b/c =$ <br> $b/d =$ | C289b, qt922, 64938 .... |
| Jane Doe | $a/b =$ <br> $d/c =$ <br> $a/c =$ <br> $a/d =$ <br> $b/c =$ | qt94b, 639z2, s4cdt .... |

ND, APPARATUS AND SYSTEM FOR
OUTPUTTING A GROUP OF IMAGES

BACKGROUND OF THE INVENTION

1. Field of the Invention

The present invention relates to a method, apparatus and system for outputting a group of images for display.

2. Description of the Prior Art

Many people have large collections of images taken over an extended period of time. These images usually contain pictures of family and friends. One reason that people take photographs is to remember certain moments, or capture certain events. These will then be reviewed, typically, many years later.

When reviewing the photographs, it is interesting to see how people have changed over time. For example, hair styles change over time as fashions change. It is very interesting to see how grandparents used to look, or how an individual has changed in appearance since high school. It is an aim of the present invention to assist in this process.

SUMMARY OF THE INVENTION

According to a first aspect of the present invention, there is provided a method of outputting a group of images for display, the group being taken from a plurality of images, each image in the plurality of images having a face located therein, the method comprising: retrieving a set of images from a storage medium, the set of images containing at least the plurality of images from which the group of images to be displayed is selected; identifying the face in each of the plurality of images; identifying variable features on the face in each of the plurality of images; establishing the group of images in accordance with a measure of the dissimilarity between the variable features in the plurality of images; and outputting the group of images for display.

The method may comprise generating metadata associated with each of the plurality of images, the metadata uniquely identifying the image within the set of images.

The method may comprise generating a database identifying the face, and associating the unique identity of the image with the face.

The method may comprise determining a facial metric for a face in each of the plurality of images, the facial metric defining unique characteristic features of the face, and comparing the determined facial metric with other stored facial metrics and identifying the face in dependence on the results of said comparison.

In this case, the facial metric may be based upon a ratio of distances between different facial features.

The group of images may be displayed on a timeline, and the position of each image on the timeline being determined in accordance with the time/date that the image was captured.

The method may comprise displaying on the timeline an event selected from a plurality of user defined events, wherein the selection of the event is based on the difference between the time/date of the event and the time/date that the image was captured.

The method may comprise cropping the image around the face and identifying the face from the cropped image.

In this case, the method may comprise displaying the cropped image in the group of images.

The method may comprise displaying the group of images as a mashup, a slideshow, a single file, a timeline or a collage.

According to another aspect, there is provided a non-transitory computer readable medium comprising computer readable instructions that, when executed by a computer, cause the computer to carry out a method of outputting a group of images for display, the group being taken from a plurality of images, each image in the plurality of images having a face located therein, the method comprising: retrieving a set of images from a storage medium, the set of images containing at least the plurality of images from which the group of images to be displayed is selected; identifying the face in each of the plurality of images; identifying variable features on the face in each of the plurality of images; establishing the group of images in accordance with a measure of the dissimilarity between the variable features in the plurality of images; and outputting the group of images for display.

According to another aspect, there is provided an apparatus for outputting a group of images for display, the group being taken from a plurality of images, each image in the plurality of images having a face located therein, the apparatus comprising a processor configured to: retrieve a set of images from a storage medium, the set of images containing at least the plurality of images from which the group of images to be displayed is selected; identify the face in each of the plurality of images; identify variable features on the face in each of the plurality of images; establish the group of images in accordance with a measure of the dissimilarity between the variable features in the plurality of images; and output the group of images for display.

The processor may be further configured to generate metadata associated with each of the plurality of images, the metadata uniquely identifying the image within the set of images.

The apparatus may comprise a database identifying the face, and the processor is configured to associate the unique identity of the image with the face.

The processor may be further configured to determine a facial metric for a face in each of the plurality of images, the facial metric defining unique characteristic features of the face, and to compare the determined facial metric with other stored facial metrics and identifying the face in dependence on the results of said comparison.

The facial metric may be based upon a ratio of distances between different facial features.

The group of images may be displayed on a timeline, and the position of each image on the timeline being determined in accordance with the time/date that the image was captured.

The processor may be configured to display on the timeline an event selected from a plurality of user defined events, wherein the selection of the event is based on the difference between the time/date of the event and the time/date that the image was captured.

The processor may be configured to crop the image around the face and identifying the face from the cropped image.

The processor may be configured to display the cropped image in the group of images.

The processor may be configured to display the group of images as a mashup, a slideshow, a single file, a timeline or a collage.

Other advantageous features and/or embodiments will become apparent from the following description and claims.

BRIEF DESCRIPTION OF DRAWINGS

The above and other objects, features and advantages of the invention will be apparent from the following detailed description of illustrative embodiments which is to be read in connection with the accompanying drawings, in which:

FIG. 10 shows a database used in the system of FIG. 1 according to embodiments.

DESCRIPTION OF THE PREFERRED EMBODIMENTS

Figure 1:
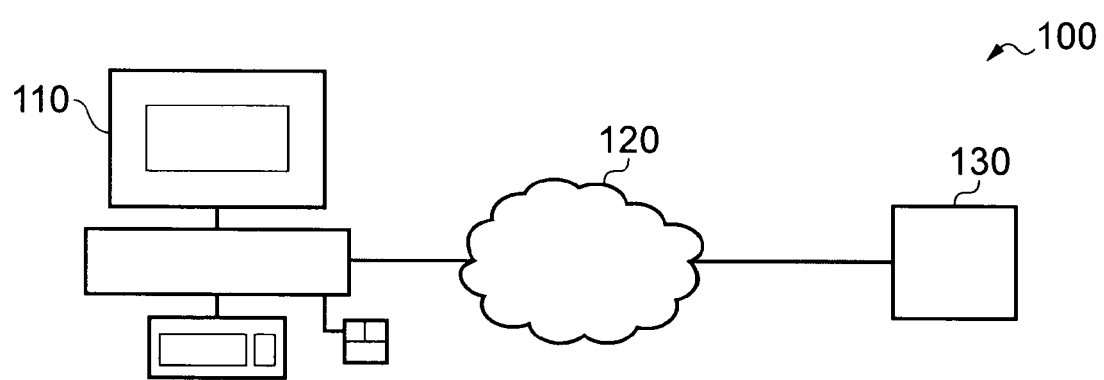
FIG. 1 shows a system according to embodiments of the present invention.

FIG. 1 shows a system 100 comprising a computer 110 having a display and a user input device attached thereto or integrated therein. The computer 110 comprises a processor upon which a computer program according to an embodiment is run. The computer program enables the computer to operate in such a manner that the computer may embody the invention. The computer program itself may be stored on a storage medium such as a magnetic or optical disc which may be located within the computer or elsewhere. Additionally, the computer program may be embodied as a signal which is provided to the computer over a network such as a local area network or the Internet or the like. The computer 110 is connected to a network 120 which may be the Internet or a local network. Also attached to the network 120 is a storage medium 130 which, in embodiments, contains images and/or other media. The media stored on the storage medium 130 may be provided by the user of the computer 110. The media may also have metadata associated therewith. The metadata may be stored on the storage medium 130 or may be stored within the computer 110.

Metadata means data about the media and is usually smaller in size that the media itself. This data may include information describing the content of the media, such as which people are located within the media, and their corresponding facial characteristic metric (see below), or a brief description of the content of the media. Alternatively, or additionally, the metadata may include information relating to the generation of the media, such as the time and/or date upon which the media was captured and/or an identifier uniquely identifying the media. The storage medium 130 may also include a database. The database may include a list of people located within the stored media and for each person, a further copy of the facial characteristic metric is stored and the unique identifier of all the stored media in which the person is located.

Although the foregoing describes the media as being located on a remote storage medium, the media may be stored locally within the computer 110. Further, the media described below is an image, although any type of media, such as video, is also envisaged.

Figure 2:
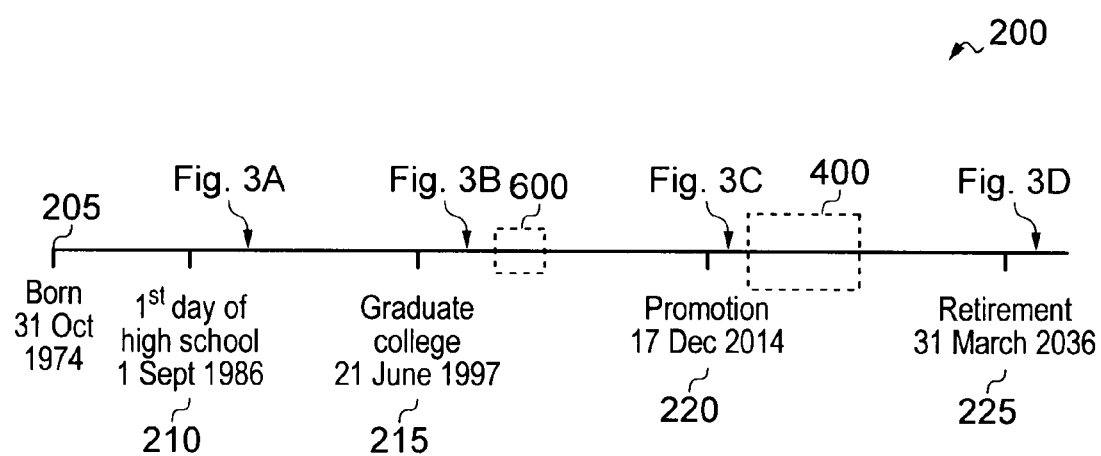
FIG. 2 shows a timeline according to embodiments of the present invention.

FIG. 2 shows a typical timeline 200 for the life of an individual. In embodiments of the present invention, the user accesses the computer 110 and inserts various dates that are important to that individual. The individual inserts a narrative associated with each date. For example, the user inserts his date of birth 205, the day he first went to high school 210, the date he graduated college 215, the date of his marriage, the day he started work, the day he was promoted within his job 220 and the date he retired 225. He may also include other dates like the date his first and second child was born, or the dates on which a charity event in which he participated started and finished. Clearly many other dates and/or events are envisaged.

Figure 3A:
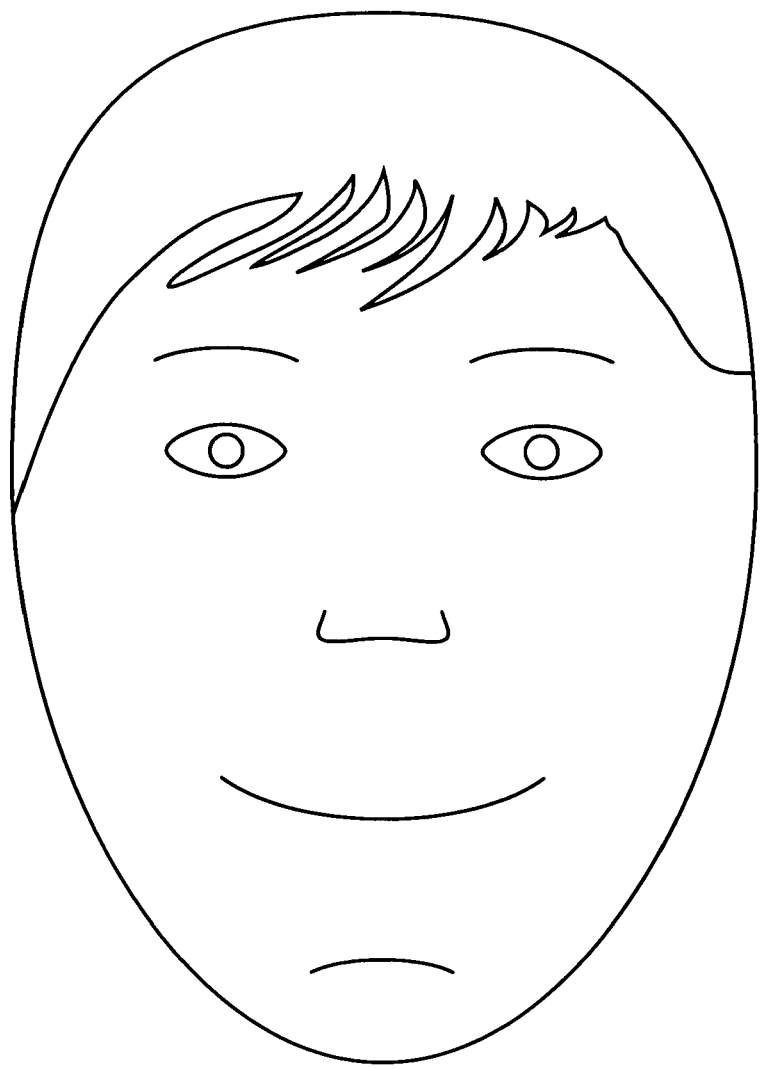
FIGS. 3A to 3D show pictures of an individual's changing hairstyle.
Figure 3B:
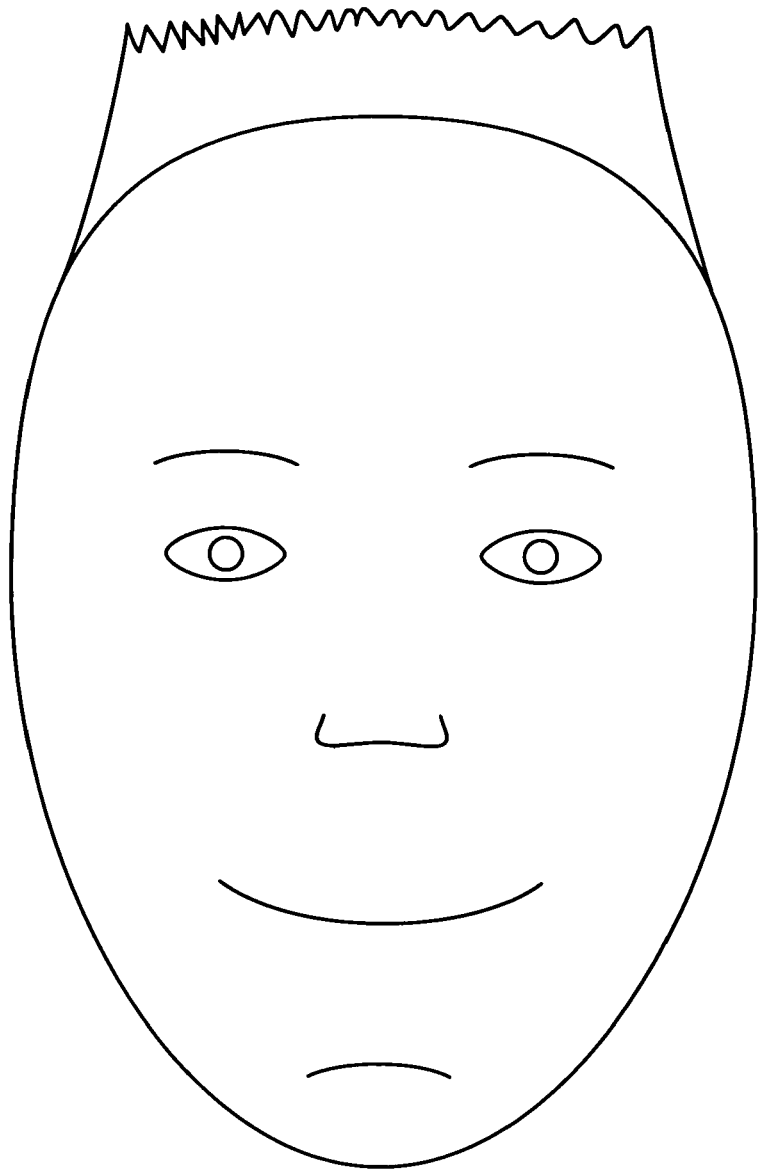
Figure 3C:
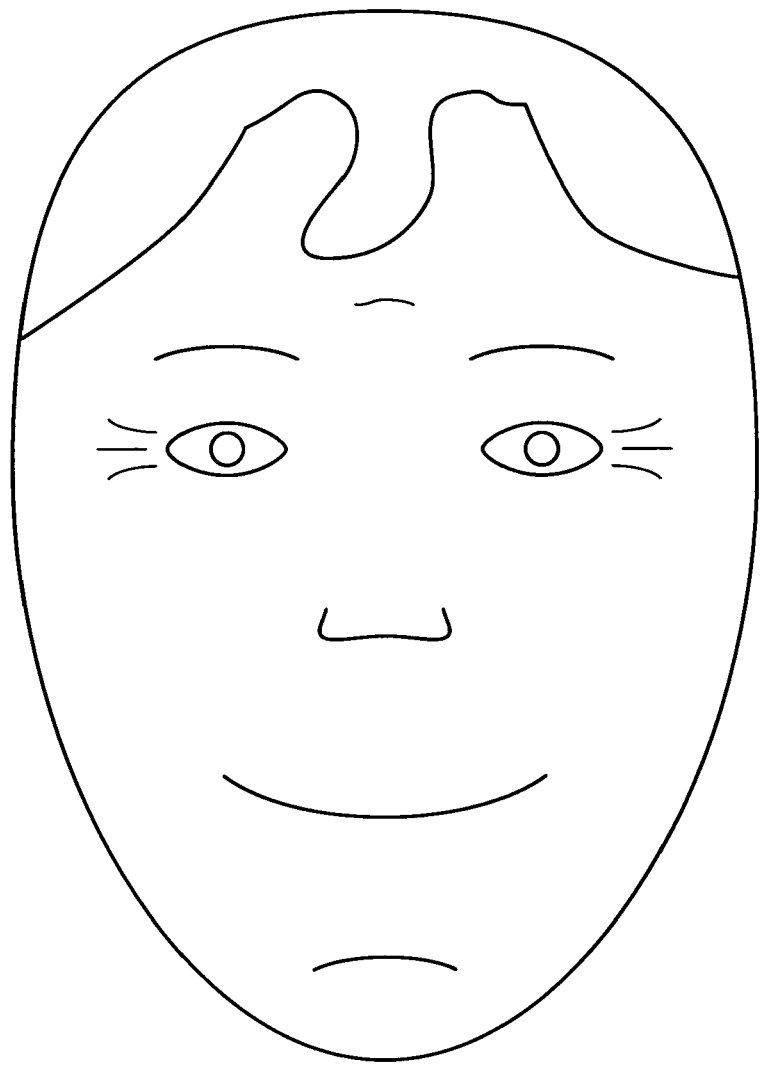
Figure 3D:
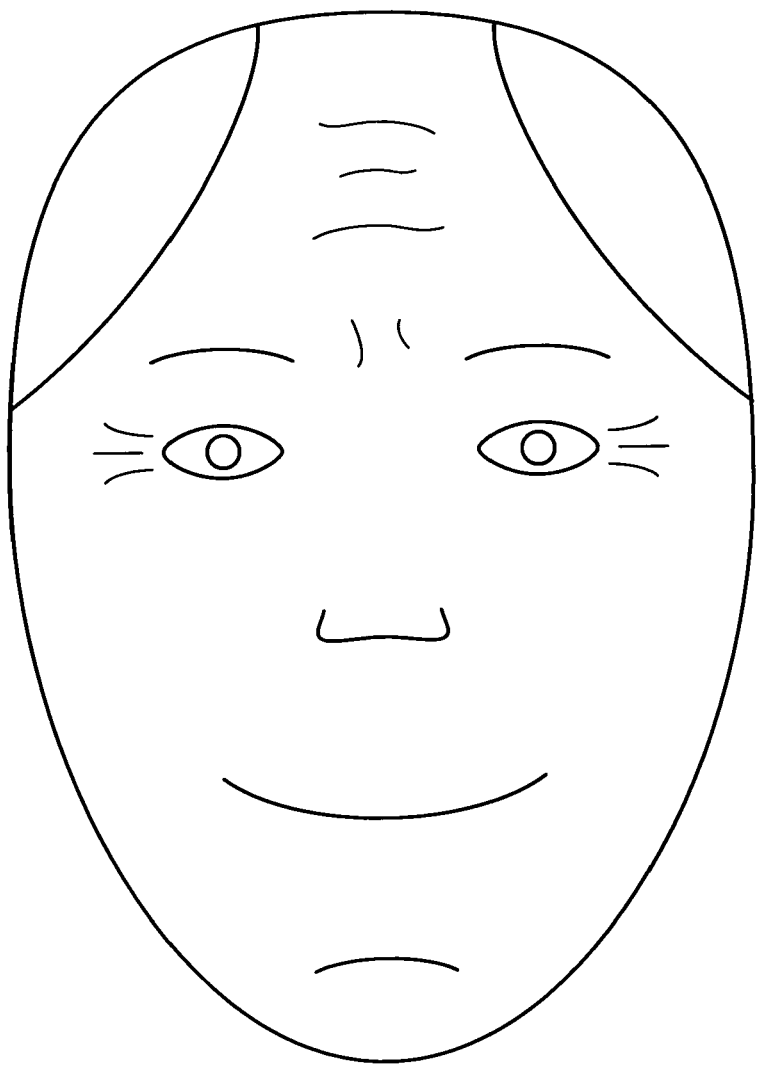

As can be seen from FIG. 2, some of the above important dates are located on the timeline. There are also located on the timeline, reference to FIG. 3A to FIG. 3D. FIGS. 3A to 3D show various facial shots of the user during his life. In particular, FIG. 3A shows a photograph of the user a few months after he started high school. Similarly, FIG. 3B shows a photograph of the user a few months after graduation. FIG. 3C shows a photograph of the user a few months after his promotion at work and FIG. 3D shows a photograph of the user a few months after his retirement.

Turning to FIG. 3A, the user has a particular hair style which is swept to one side. However, in FIG. 3B, the user has a very different hair style to FIG. 3A; specifically, in FIG. 3B the user's hair is spiky. FIG. 3C shows another very different hair style. In FIG. 3C, the user has a receding hair line. FIG. 3D shows yet another hair style as the user is nearly bald. It should be noted that in FIGS. 3C and 3D, the face of the user has different degrees of aging (see wrinkles around the eyes in FIG. 3C and additional furrows in the brow in FIG. 3D).

FIGS. 3A to 3D show that the hair style of the user varies as he gets older. Specifically, the user's hairstyle is very different between each of FIG. 3A to FIG. 3D.

Figure 4:
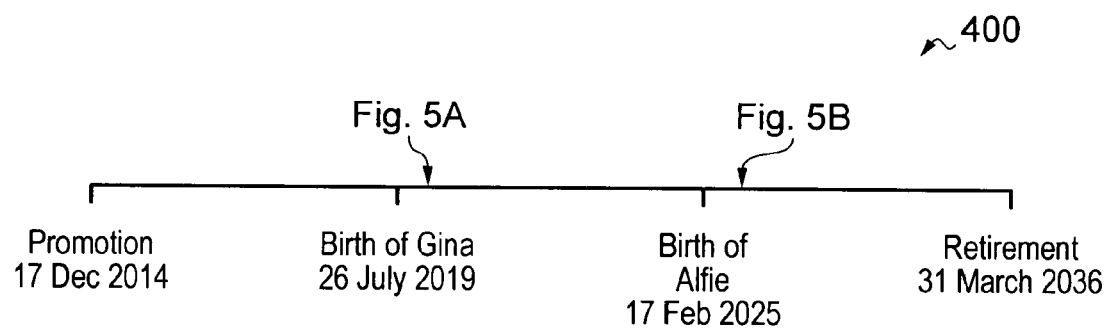
FIG. 4 shows a more detailed section of the timeline of FIG. 2.
Figure 5A:
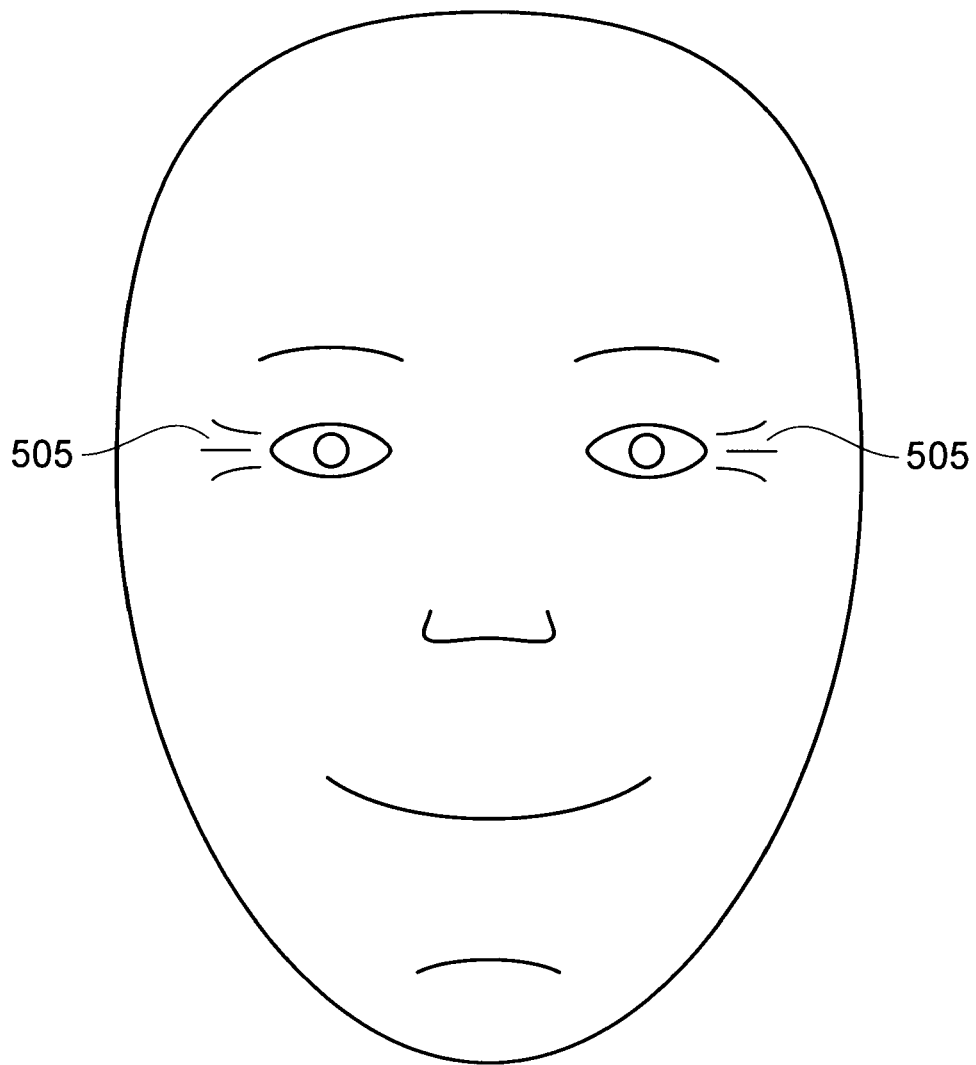
FIG. 5A-5B show pictures of an individual ageing.
Figure 5B:
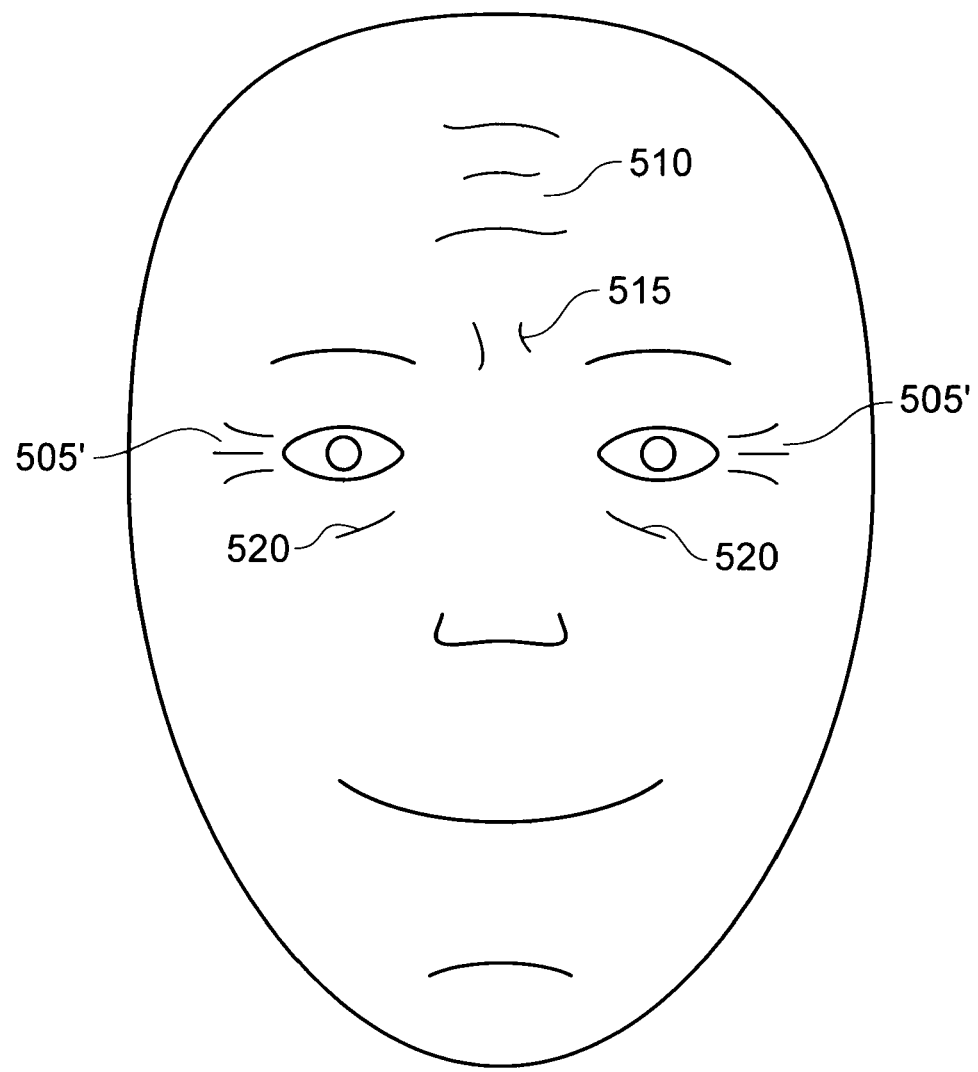

FIG. 4 shows a close-up 400 of a section of the timeline of FIG. 2. Specifically, FIG. 4 shows the section between the promotion and retirement. In FIG. 4, a photograph showing the user in FIG. 5A is shown near to the birth of the user's first child (Gina). Similarly, a photograph showing the user in FIG. 5B is shown near to the birth of the user's second child (Alfie). As is seen in FIG. 5A and FIG. 5B, the difference between the user is the amount of ageing. For example, in FIG. 5A, the user has wrinkles near each eye 505. In FIG. 5B however, the user has slightly deeper wrinkles near each eye 505', furrows in his forehead 510, wrinkles between his eyes 515 and wrinkles below each eye 520. In other words, the user has different facial features between the image in FIG. 5A and the image in FIG. 5B. As should be noted here, the hair of the user has deliberately been omitted from FIGS. 5A to 5B to emphasise that the invention is not limited to hairstyles, but can be useful in selecting images based on any variable metric.

Figure 6:
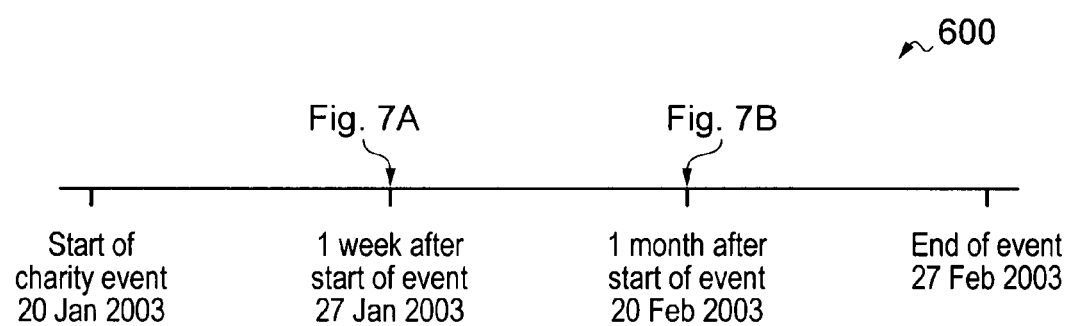
FIG. 6 shows a more detailed section of the timeline of FIG. 2.
Figure 7A:
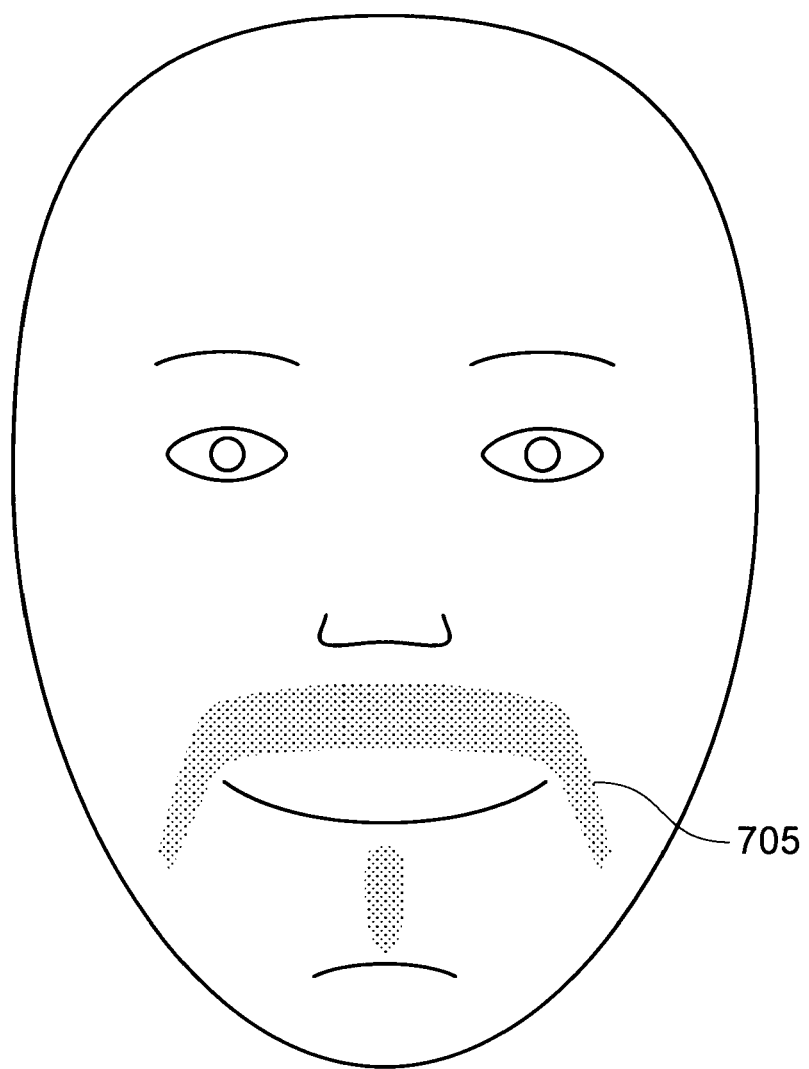
FIG. 7A-7B show pictures of an individual growing facial hair.
Figure 7B:
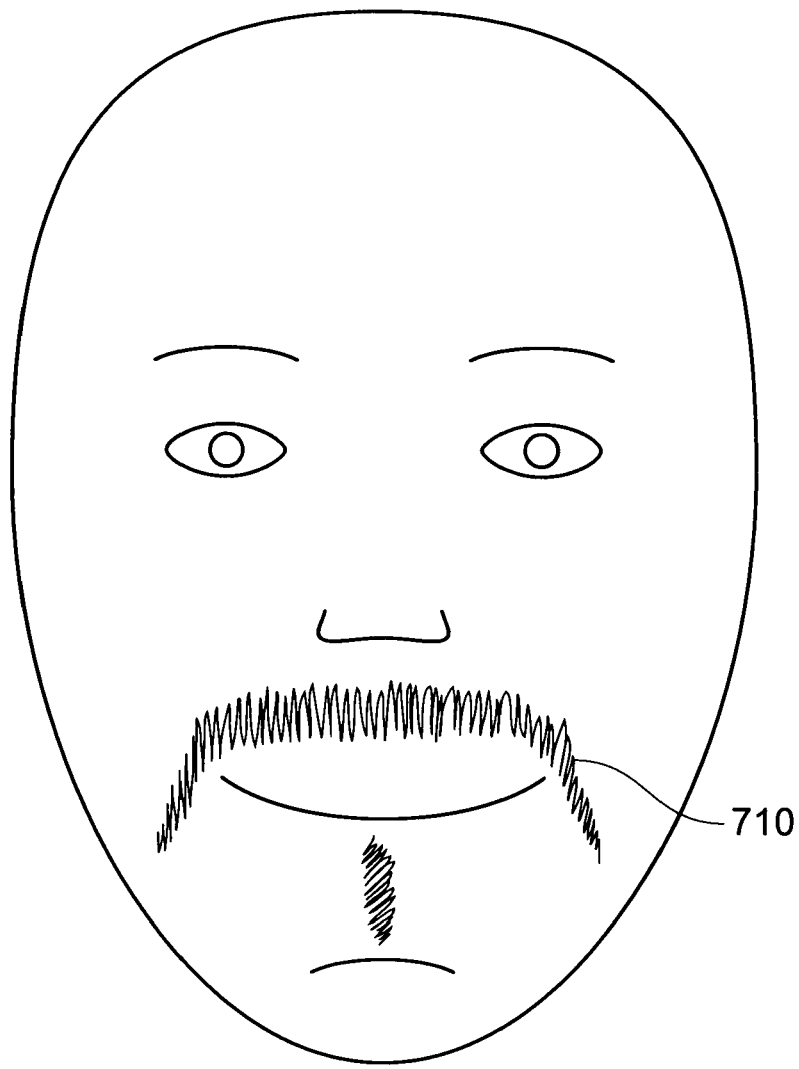

FIG. 6 shows a close-up 600 of a different section of the timeline of FIG. 2. Specifically, FIG. 6 shows a section between graduating college and promotion. During this period, the user inserted that participating in a charity event was important to the user. In the example, the user took part in a charity event to grow a moustache. A photograph showing the user in FIG. 7A is shown one week after the start of the charity event. Similarly, a photograph showing the user in FIG. 7B is shown one month after the start of the charity event. In FIG. 7A, the photograph shows the user having stubble 705. In FIG. 7B, the photograph shows the user having a fully grown moustache 710. For clarity, the hair of the user, and any differences in facial features due to aging have been omitted to emphasise that any type of variable facial characteristics may be used and that embodiments of the invention are not limited to hairstyles, or aging.

Figure 9:
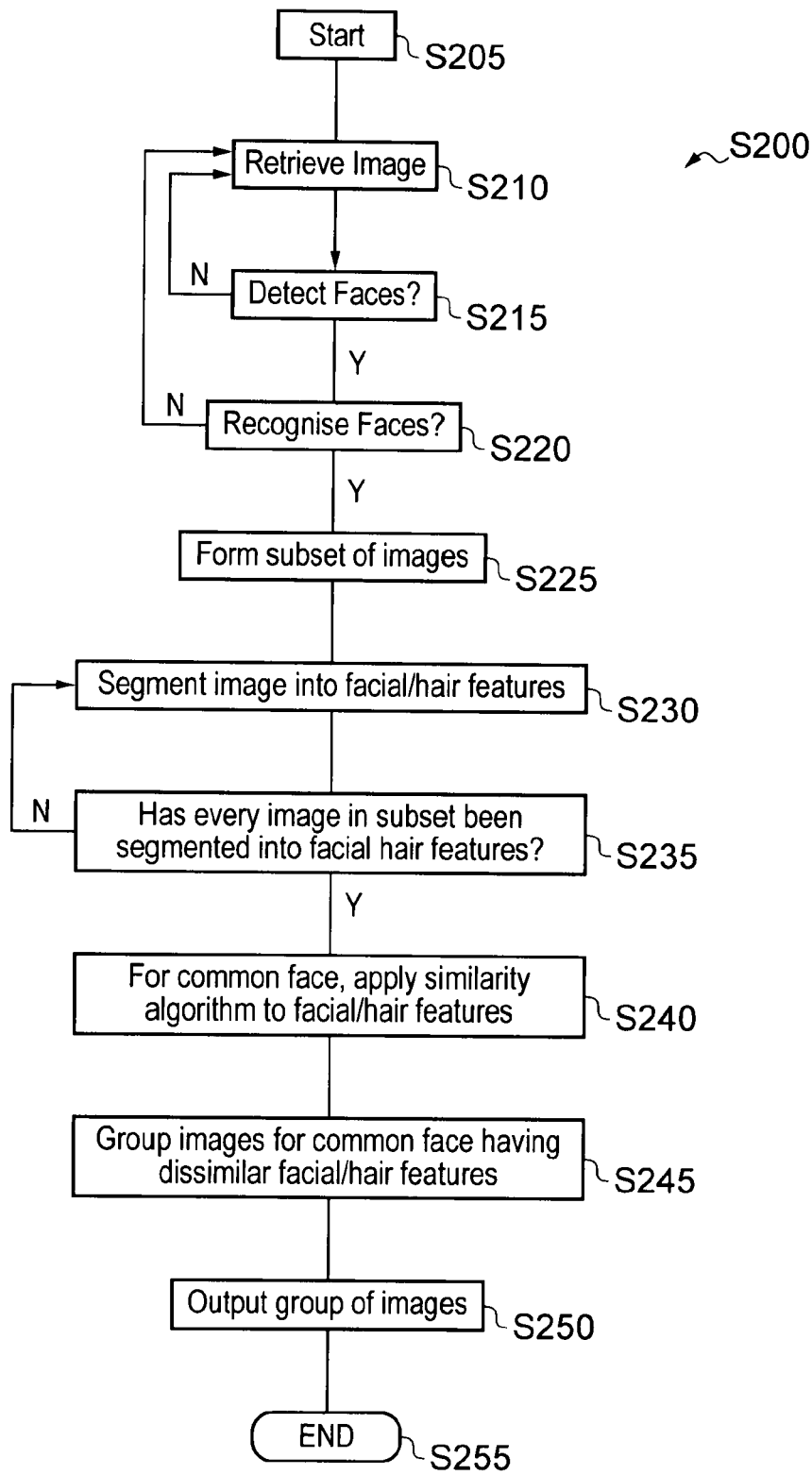
FIG. 9 shows a flow chart explaining the process carried out by the system of FIG. 1 according to embodiments.

A flow chart S200 showing the operation of the computer 110 according to one embodiment is shown in FIG. 9. Following the start S205 of the embodiment, an image is retrieved from the storage medium 130 in step S210. Although not specifically shown, the computer in steps S210 to S220 will retrieve only images which have no unique identifier associated with it. As will become apparent, after the image has been analysed, the metadata for the image is updated meaning that only new images need to be analysed in the future. This saves processing power and allows huge catalogues of images to be used in embodiments of the present invention.

Typically, the retrieved image will contain the user as well as other objects such as landmarks, buildings, animals and other people. Therefore, for each image that is retrieved, a face detection algorithm is applied to the image to detect the presence of faces within the image. This is step S215. A typical face detection algorithm used in step S215 is described in US2008/0013837A, the contents of which is hereby incorporated by reference.

If the image includes no faces, then path "N" is followed. The metadata associated with the image is updated to provide the image with a unique identifier and an indication that the image contains no faces.

Figure 8:
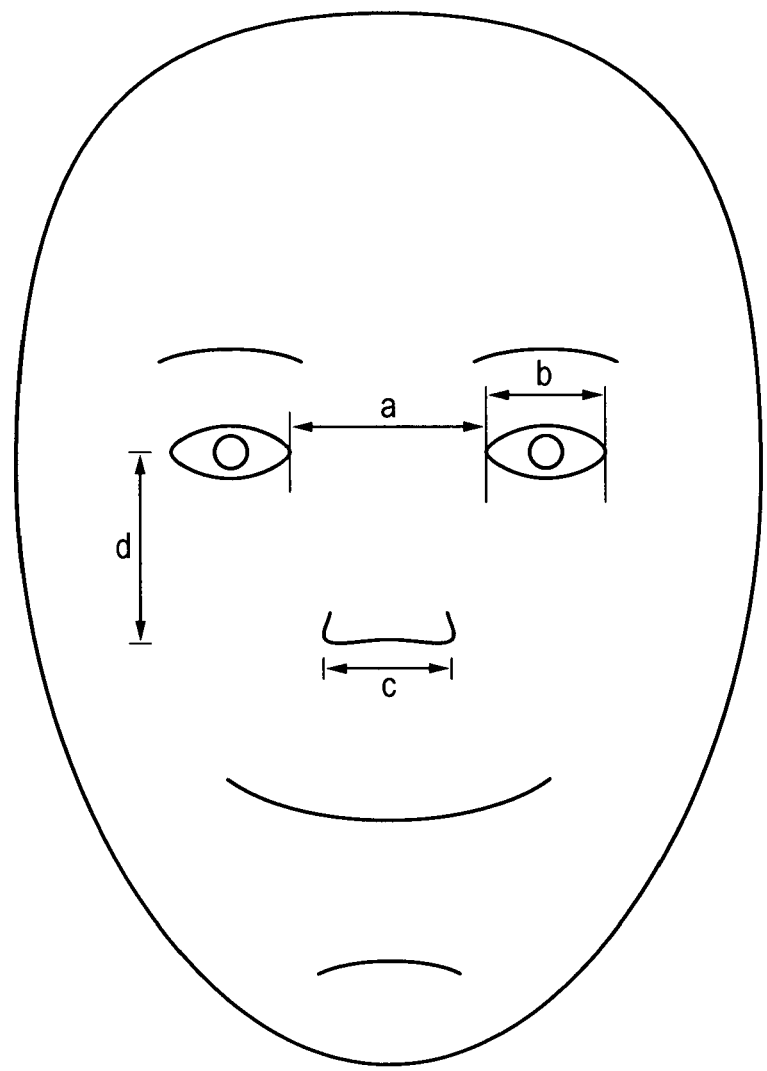
FIG. 8 shows a picture of an individual which details the measurements that are taken in embodiments to recognise the individual.

Alternatively, if one or more faces are detected the algorithm moves onto Step S220. In step S220, the algorithm determines whether the detected face is recognised. One method of recognising a face involves analysing features of the face. In particular, as shown in FIG. 8, the relative size and/or position of certain characteristic features of the face are determined. These form the facial characteristic metrics which are stored in the database on the storage medium 130. By storing the facial characteristic metrics in association with the each person located within the image means that it is possible to identify each person within the image quickly. Also, by only storing the metrics (which are pieces of text, numerals and/or feature vectors), the amount of storage space required is small.

In FIG. 8, it can be seen that for each detected face the distance between the eyes is measured a, the size of the eyes is measured b, the vertical distance between the eyes and the tip of the nose is measures d and the width of the tip of the nose is measured c. The metric is not these measured values as they may change as the person ages. Also, the focal length and zoom of the camera will affect the dimensions of these measurements. Instead, the relative size of each of these measurements is calculated. For example, the ratios a/b, d/c, a/c, a/d, b/c, b/d are measured and stored. These ratios will be similar as the person ages and will be independent of the focal length and zoom of the camera capturing the image. After the above ratios are calculated for each face in the retrieved image, they are compared against measurements in the database. If the calculated ratios are within a predetermined threshold amount of the stored values (for example are within +/−1%), then the detected face is deemed to be that person. Alternatively, for detected faces that are outside this boundary, the user may be prompted to enter the name of the unidentified person so that they may be added to the database. Also, it is envisaged that if the calculated ratios are slightly outside the threshold amount, for example are more than 1% outside the value, but less than 5% outside the threshold, a "best guess" may be provided to the user to simply confirm if the person in the image is that person in the database. This provides a quick confirmation of the identity of the person After the facial recognition is performed, the metadata for the image is completed ensuring that the identity of any people within the image is stored and providing a unique identifier to the image. The database is also updated ensuring that the unique identifier of the image is associated with any people profiles stored within the database.

In step S225, all images containing the selected person are provided. These images will be identified from within the database as the unique identifier for each piece of media is stored in association with the person within the database. In reality, there may be many faces within one image. However, as only one person is to be analysed, the faces within the image are detected, and the feature characteristic metrics stored in the database are used to identify the person within the image. This means that after the person is identified, the face can be cropped from the image and the remaining parts of the image discarded. This reduces the amount of processing required.

The face of the person within the image is segmented into variable features which change significantly over time and non-variable features that do not change significantly over time. As noted in the Figures, variable features include facial hair, hair styles as well as areas of the face which significantly change over time. For example variable features may also include wrinkles near and under the eyes, on the forehead and around the mouth. Non-variable features may include eyes, nose, ears, mouth as the size and/or shape of these do not change over time. In order to segment the image into variable and non-variable features, it is possible to perform edge detection which will distinguish between areas of different colour around the facial area. Edge detection (such as disclosed in GB2454214A, the contents of which is hereby incorporated by reference) will identify the hair and any facial hair as hair colour is typically significantly different to skin colour. The other variable features can be identified from the location on the face. For example, the eyes, nose and mouth of a person is identified when performing image recognition. The areas adjacent these features can be analysed to identify wrinkles using any appropriate image processing technique.

After each face within the image has been segmented into variable features and non-variable features, the process moves to step S235. In step S235 it is determined whether all the images in the subset have been analysed. If not, then the process returns to step S230. However, if every image in the subset has been analysed, the process moves onto step S240.

In step S240, a similarity algorithm is applied to the variable features in each image. The similarity algorithm, for each of the variable features within the subset of images, generates a similarity measure. The similarity measure describes the degree of similarity between each of the variable features in the subset of images. In other words, each of the variable features are compared to the other variable features and the degree of similarity between each of the variable features is established. The variable features having a low similarity value are therefore deemed to be dissimilar. It should be noted here that the variable feature which is to be analysed is selected by the user. For example, the user may wish to analyse hair style as the variable feature, or facial hair as the variable feature. Indeed, the user may wish to analyse wrinkles round the eyes as the variable feature. However, whichever of the variable features is selected by the user, only those variable features are compared amongst each image in the subset. So, if the user selects "hair" as the variable feature, only "hair" is analysed in each of the images in the subset. The similarity algorithm may determine the Euclidean distance between feature vectors such as described in EP2015203A, the contents of which are hereby incorporated by reference.

After the similarity values for each of the variable features in the sub-set of images are determined, the images in the subset are ordered according to similarity values (S245). The grouped subset is then output in accordance with a user requirement. Specifically, the user may wish to select the top 10 most dissimilar hair styles. If this is the case, the 10 images having the lowest similarity values are output (S250).

The images may be output on a timeline as shown in FIGS. 2, 4 and 6. In this case, the metadata for each image is analysed and the time/date stamp for each image is retrieved. This timestamp is compared with the user information which describes important events in the user's life. The user information that is closest in time to the time/date stamp is retrieved and placed on a timeline along with the images. By referencing the hair styles to important event, the user will be able to recall memories more easily. Alternatively, other mechanisms for outputting the images are envisaged. For example, a folder of images may be created, which may be cropped or otherwise. A collage of images in a single file may be provides, a slideshow or slideshow movie may be created. Alternatively, a picture mashup (where many pictures are used to create a single representation) may be created.

The process moves to step S255 where the operation terminates.

Embodiments of the present invention may be provided as computer readable instructions which, when loaded onto a computer configure the computer to perform any of the above processes. The instructions may be provided as software. This software may be embodied as signals or on a storage medium which may be an optically readable or magnetically readable medium.

FIG. 10 shows an example of the database that can be used in embodiments of the present invention.

The database 1000 stores the names of individuals in a name column 1010. Associated with each name is stored the facial metrics in column 1020. Additionally, associated with each name is a list of the images in which the individual is located in column 1030. Therefore, by calculating the facial metrics, it is possible to identify which individual is located within any one photograph. Moreover, it is possible to identify the other photographs in which the individual is located from column 1030.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of outputting images, the method comprising:
    retrieving a plurality of images from a storage medium, the plurality of images including a group of images and a specific face of a same person is included within each image of the plurality of images;
    identifying, by circuitry, the specific face of the same person within each of the plurality of images;
    segmenting the specific face in each of the plurality of images, by the circuitry after the identifying and when the specific face is successfully identified in each of the plurality of images, into a plurality of variable features and non-variable features, the variable features of the specific face being features of the same person that change over time and the non-variable features of the specific face being features of the same person that do not change over time;
    identifying a specific variable feature of the plurality of variable features, the specific variable feature designated by a user;
    measuring, by the circuitry for each particular image of the plurality of images, a degree of similarity between the specific variable feature in the particular image and the specific variable feature in each of the other plurality of images;
    ordering the plurality of images according to the measured degree of similarity for each of the plurality of images;
    identifying the group of images, from the plurality of images ordered in the ordering, according to the ordering and the specific variable feature identified in each of the plurality of images; and
    outputting the group of images.

2. The method according to claim 1, further comprising:
    generating metadata for each image of the plurality of images, the metadata uniquely identifying each particular image within the plurality of images.

3. The method according to claim 2, further comprising:
    generating a database for identifying the specific face; and
    associating the metadata of each image with the specific face to uniquely identify the specific face.

4. The method according to claim 1, further comprising:
    determining, by the circuitry, a facial metric for the specific face in each of the plurality of images, the facial metric defining unique characteristic features of the specific face;
    comparing the determined facial metric with other stored facial metrics; and
    identifying the specific face based on results of said comparison.

5. The method according to claim 4, wherein the facial metric is based on a ratio of distances between different facial features.

6. The method according to claim 1, further comprising displaying each image of the group of images on a timeline, wherein
    each image is positioned on the timeline according to a time/date that the image was captured.

7. The method according to claim 6, further comprising:
    selecting an event from a plurality of user defined events; and
    displaying the event on the timeline, wherein
    the event is selected based on a difference between the time/date of the event and the time/date that the images of the group of images were captured.

8. The method according to claim 1, further comprising cropping an image, of the group of images, around the specific face, wherein
    the specific face is identified from the cropped image.

9. The method according to claim 8, further comprising displaying the cropped image in the group of images.

10. A non-transitory computer readable medium comprising computer readable instructions that, when executed by a computer, cause the computer to carry out a method of outputting a group of images, the method comprising:
    retrieving a plurality of images from a storage medium, the plurality of images including a group of images and a specific face of a same person is included within each image of the plurality of images;
    identifying the specific face of the same person within each of the plurality of images;
    segmenting the specific face in each of the plurality of images, after the identifying and when the specific face is successfully identified in each of the plurality of images, into a plurality of variable features and non-variable features, the variable features of the specific face being features of the same person that change over time and the non-variable features of the specific face being features of the same person that do not change over time;

identifying a specific variable feature of the plurality of variable features, the specific variable feature designated by a user;

measuring, for each particular image of the plurality of images, a degree of similarity between the specific variable feature in the particular image and the specific variable feature in each of the other plurality of images;

ordering the plurality of images according to the measured degree of similarity for each of the plurality of images;

identifying the group of images, from the plurality of images ordered in the ordering, according to the ordering and the specific variable feature identified in each of the plurality of images; and outputting the group of images.

11. An apparatus, comprising:

processing circuitry configured to:

retrieve a plurality of images from a storage medium, the plurality of images including a group of images and a specific face of a same person is included within each of the plurality of images;

identify the specific face of the same person within each of the plurality of images;

segment the specific face in each of the plurality of images, after the identifying and when the specific face is successfully identified in each of the plurality of images, into a plurality of variable features and non-variable features, the variable features of the specific face being features of the same person that change over time and the non-variable features of the specific face being features of the same person that do not change over time;

identify a specific variable feature of the plurality of variable features, the specific variable feature designated by a user;

measure, for each particular image of the plurality of images, a degree of similarity between the specific variable feature in the particular image and the specific variable feature in each of the other plurality of images;

order the plurality of images according to the measured degree of similarity for each of the plurality of images; and identify the group of images, from the plurality of images ordered in the ordering, according to the ordering and the specific variable feature identified in each of the plurality of images; and output the group of images.

12. The apparatus according to claim 11, wherein the processing circuitry is further configured to generate metadata for each image of the plurality of images, the metadata uniquely identifying each particular image within the plurality of images.

13. The apparatus according to claim 12, further comprising a database for identifying the specific face, wherein the processing circuitry is further configured to utilize the database to associate the metadata of the image with the specific face to uniquely identify the specific face.

14. The apparatus according to claim 13, wherein the processing circuitry is further configured to:

determine, for each image of the plurality of image, whether the image includes a timestamp; and compare, for each image including a timestamp, the timestamp to information within the metadata, wherein the plurality of images are further ordered according to the comparisons between each timestamp and the metadata.

15. The apparatus according to claim 11, wherein the processing circuitry is further configured to:

determine a facial metric for the specific face in each of the plurality of images, the facial metric defining unique characteristic features of the specific face;

compare the determined facial metric with other stored facial metrics; and identify the specific face based on results of said comparison.

16. The apparatus according to claim 15, wherein the facial metric is based on a ratio of distances between different facial features.

17. The apparatus according to claim 11, wherein the processing circuitry is further configured to output the group of images on a timeline, and each image is positioned on the timeline according to a time/date that the image was captured.

18. The apparatus according to claim 17, wherein the processing circuitry is further configured to:

select an event from a plurality of user defined events; and output, to the display, the event on the timeline, wherein the event is selected based on a difference between the time/date of the event and the time/date that the images of the group of images were captured.

19. The apparatus according to claim 11, wherein the processing circuitry is further configured to crop an image, of the group of images, around the specific face, wherein the specific face is identified from the cropped image.

20. The apparatus according to claim 19, wherein the processing circuitry is further configured to output the cropped image in the group of images.

21. The apparatus according to claim 20, wherein the processing circuitry is further configured to output the group of images as a mashup, a slideshow, a single file, a timeline or a collage.

* * * * *